United States Patent
Yao (10) Patent No.: US 11,445,008 B2
(45) Date of Patent: Sep. 13, 2022

(54) DATA PROCESSING METHODS, ELECTRONIC DEVICES, AND STORAGE MEDIA

(71) Applicant: BEIJING BAIDU NETCOM SCIENCE AND TECHNOLOGY CO., LTD., Beijing (CN)

(72) Inventor: Qianpeng Yao, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/021,503

(22) Filed: Sep. 15, 2020

(65) Prior Publication Data
US 2021/0185111 A1    Jun. 17, 2021

(30) Foreign Application Priority Data
Dec. 16, 2019  (CN) .......................... 201911294421.9

(51) Int. Cl.
*G06F 15/16*    (2006.01)
*H04L 67/06*    (2022.01)
(Continued)

(52) U.S. Cl.
CPC .......... *H04L 67/06* (2013.01); *H04L 12/4633* (2013.01); *H04L 67/01* (2022.05); *H04L 67/1097* (2013.01); *H04L 67/535* (2022.05)

(58) Field of Classification Search
CPC . H04L 67/06; H04L 12/4633; H04L 67/1097; H04L 67/22; H04L 67/42
(Continued)

(56) References Cited

U.S. PATENT DOCUMENTS

| | | | | |
|---|---|---|---|---|
| 2011/0131499 | A1* | 6/2011 | Ferris | G06F 9/452 709/224 |
| 2015/0227598 | A1* | 8/2015 | Hahn | G06F 16/11 707/737 |
| 2016/0292263 | A1* | 10/2016 | Ferrar | G06F 16/248 |

FOREIGN PATENT DOCUMENTS

| | | |
|---|---|---|
| CN | 103561082 A | 2/2014 |
| CN | 105260183 A | 1/2016 |

(Continued)

OTHER PUBLICATIONS

Rahul Soni, "Nginx From Beginner to Pro Rahul Soni", Jan. 1, 2016, P055367158, Retrieved from the Internet: URL:http://dl.acm.org/citation.cfm?id=3008 165, p. 89-p. 90, p. 97-p. 106, section installing PHP; p. 134-p. 139.

(Continued)

*Primary Examiner* — Atta Khan
(74) *Attorney, Agent, or Firm* — Novick, Kim & Lee, PLLC; Zhi Yang Xue; Jihun Kim (57) ABSTRACT

A data processing method, an electronic device and a storage medium are related to the field of big data technologies. The solution is: receiving a file to be processed from a web server; invoking a target process to process the file to be processed, to generate a request result; storing the request result in a preset storage area; running a preset request finishing function; obtaining the request result from the preset storage area in response to the running the preset request finishing function; sending the request result to the web server; and reporting the request result to a cloud data center.

8 Claims, 7 Drawing Sheets

(51) Int. Cl.
  *H04L 12/46*      (2006.01)
  *H04L 67/1097*    (2022.01)
  *H04L 67/01*      (2022.01)
  *H04L 67/50*      (2022.01)

(58) Field of Classification Search
  USPC .......................................................... 709/219
  See application file for complete search history.

(56) References Cited

FOREIGN PATENT DOCUMENTS

| CN | 108289165 A | 7/2018 |
| WO | 2016187771 A1 | 12/2016 |

OTHER PUBLICATIONS

Chaniotis Ioannis K. et al., "Is Node.js a viable option for building modern web applications? A performance evaluation study", Computing, Springer, Vienna, At, vol. 97, No. 10, Mar. 28, 2014 (Mar. 28, 2014), pp. 1023-1044, XP035541403, ISSN: 0010-485X, DOI: 10.1007/S00607-014-0394-9.
Norbert Wienold, European Search Report for EP Application No. 20212357.6, dated Jul. 13, 2021, EPO, Germany.
Shuo Yang, "Office Action for CN Application No. 201911294421. 9", dated Mar. 4, 2022, CNIPA, China.

\* cited by examiner

DATA PROCESSING METHODS, ELECTRONIC DEVICES, AND STORAGE MEDIA

CROSS-REFERENCE TO RELATED APPLICATION

This application claims priority to Chinese Patent Application No. 201911294421.9, filed on Dec. 16, 2019, the entire contents of which are incorporated herein by reference.

FIELD

The disclosure relates to the field of data processing technologies, in particular, to the field of big data technologies, and provides a data processing method, an electronic device, and a storage medium.

BACKGROUND

Generally, data reporting refers to the aggregation of user behavior data, application runtime logs or other valuable data, generated by a server application or a client application, to a data center. In the era of the Internet and mobile Internet, the value of data is getting higher and higher, and thus how to aggregate and report data is of great importance.

In the related art, a request result can be fed back to a user after the data reporting is completed. Therefore, in order to improve the efficiency of obtaining the request result, data is usually stored synchronously to a message queue component that supports high speed write-in. Queue data is consumed by a scheduler, and then the data is reported to a data center. Such a method of using intermediate components for storage and scheduling requires additional components, resulting in higher system complexity, increased difficulty in implementation, increased maintenance costs, and a longer time taken by the main process as the data needs to be written to the queue synchronously. Or, a single thread or process is specifically used to report data. The process/thread of main services will pass or share data to be reported to a data reporting process/thread. Such a method of using a specific single process/thread for reporting needs to solve the problem of data communication between processes/threads. In addition, since a new process/thread is developed, more system resources will be occupied.

SUMMARY

Embodiments of a first aspect of the disclosure provide a data processing method, including: receiving a file to be processed from a web server; invoking a target process to process the file to be processed, to generate a request result; storing the request result in a preset storage area; running a preset request finishing function; obtaining the request result from the preset storage area in response to the running the preset request finishing function; sending the request result to the web server; and reporting the request result to a cloud data center.

Embodiments of a second aspect of the disclosure provide a data processing method, including: obtaining request data; encapsulating the request data through a preset protocol to generate a file to be processed; sending the file to be processed to a background processor, such that the background processor invokes a target process to process the file to be processed to generate a request result, stores the request result in a preset storage area, runs a preset request finishing function, obtains the request result from the preset storage area in response to the running the preset request finishing function, sends the request result to the web server; and receiving the request result from the background processor.

Embodiments of a third aspect of the disclosure provide an electronic device including at least one processor and a storage device communicatively connected to the at least one processor. The storage device stores an instruction executable by the at least one processor. The instruction is executed by the at least one processor to enable the at least one processor to perform the above data processing method.

BRIEF DESCRIPTION OF THE DRAWINGS

The accompanying drawings are used for a better understanding of the solution, and do not constitute a limitation of the disclosure.

DETAILED DESCRIPTION

Exemplary embodiments of the disclosure are described below with reference to the accompanying drawings, which include various details of the embodiments of the disclosure to facilitate understanding, and should be considered as merely exemplary. Therefore, those skilled in the art should recognize that various changes and modifications may be made to the embodiments described herein without departing from the scope and spirit of the disclosure. Also, for clarity and conciseness, descriptions of well-known functions and structures are omitted in the following description.

In view of the above description of the background, it may be understood that, in the related art, the request result can be returned to a request client after data reporting is completed, that is, the efficiency of a user obtaining the request result depends on the time for data reporting. However, improving the efficiency of reporting data by means of using intermediate components for storage and scheduling requires additional components, resulting in increased difficulty in implementation, increased maintenance costs, and a longer time taken by the main process as the data needs to be written to the queue synchronously. Alternatively, a method of developing a specific process/thread to improve the efficiency of reporting the data needs to solve problems of data communication between processes/threads, and more resources occupied by the newly developed process/thread.

To solve the above problems, the disclosure provides a data processing method. The data processing method receives a file to be processed from a web server, in which the file to be processed is generated by encapsulating request data through a preset protocol; invokes a target process to process the file to be processed to generate a request result; stores the request result in a preset storage area; runs a preset request finishing function; obtains the request result from the preset storage area; sends the request result to the web server; and reports the request result to a cloud data center. In this manner, the disclosure may improve the efficiency in obtaining the request result for the user without adding additional components or developing a new thread/process.

In order to help those skilled in the art better understand the data processing method of the disclosure, the description will be made on a background processor side with reference to FIG. 1.

Figure 1:
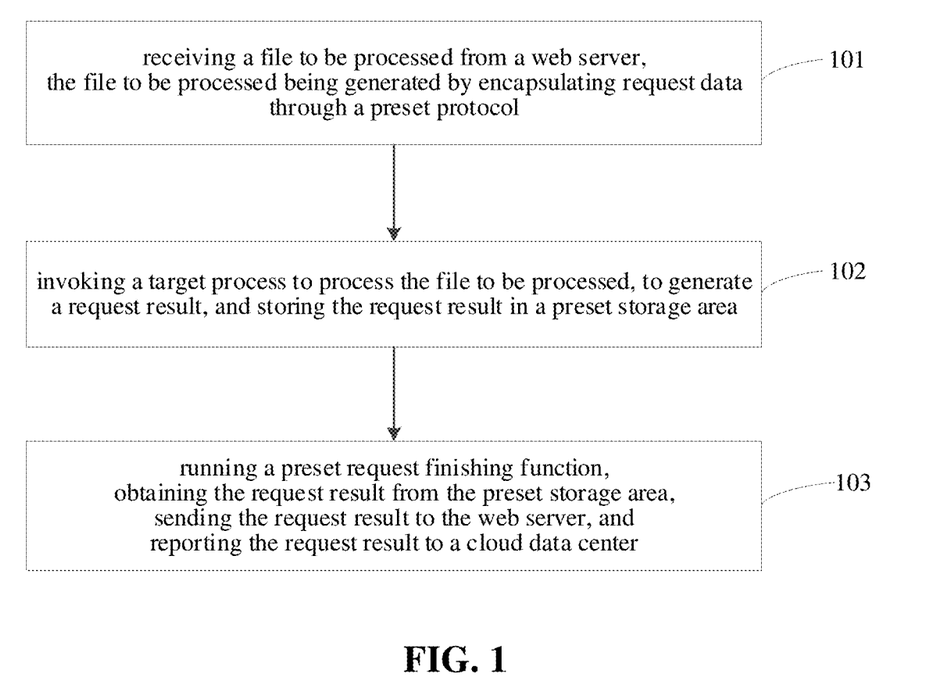
FIG. 1 is a flowchart of a data processing method according to an embodiment of the disclosure.

FIG. 1 is a flowchart of a data processing method according to an embodiment of the disclosure. As illustrated in FIG. 1, the method includes the following.

At block 101, a file to be processed is received from a web server, in which the file to be processed is generated by encapsulating request data through a preset protocol.

In practical applications, the request data of a client is sent to the web server. When the web server determines that the request data is a dynamic professional hypertext preprocessor (PHP) file, the request data is encapsulated into the file to be processed through the preset protocol such as the FastCGI (a type of common gateway interface) protocol. The file to be processed may be sent to the background processor, and may be processed by a relevant process.

At block 102, a target process is invoked to process the file to be processed, to generate a request result, and the request result is stored in a preset storage area.

Therefore, since the file to be processed received is generated by encapsulating the request data through the preset protocol, that is, the request data is converted through the protocol into a file format that may be processed, the file to be processed may be directly processed, so that the target process is invoked to process the file to be processed to generate the request result, and the request result is stored in the preset storage area.

Different request data may correspond to different request results. For example, information of user A is obtained as the request data, by invoking the target process, a user identifier corresponding to user A is obtained and user information corresponding to the user identifier is queried from a corresponding database as the request result. The preset storage area may also be selected and set based on actual application needs.

At block 103, a preset request finishing function is run, the request result is obtained from the preset storage area, the request result is sent to the web server, and the request result is reported to a cloud data center.

In detail, after the request result is generated, the preset request finishing function such as fastcgi_finish_request( ) may be automatically or manually run by the user, which will directly end the data request of the FastCGI protocol, and the request result is returned to the web server. The web server sends the request result to the request client. Meanwhile, the request result is reported to the cloud data center.

It may be understood that the request result may be fed back to the request client before data reporting is completed. It may also be understood that the data reported to the cloud data center may include not only the request result, but also request receiving time, request processing time, database used and the user identifier, which may be reported to the cloud data center as well for subsequent question inquiry, and so on.

There are many ways to report the request result to the cloud data center. As a possible implementation, the request result is added to a static array, and a preset reporting interface is invoked to process the request result to write the request result to the cloud data center.

With the data processing method according to embodiments of the disclosure, the file to be processed from the web server, which is generated by encapsulating the request data through the preset protocol, is received; the target process is invoked to process the file to be processed to generate the request result, and the request result is stored in the preset storage area; the preset request finishing function is run, the request result is obtained from the preset storage area, the request result is sent to the web server, and the request result is reported to the cloud data center. Consequently, the disclosure solves the technical problem of low efficiency in providing the request result in the related art because the request result may be fed back to the user after data is reported. In addition, the request result may be sent to the web server and reported to the could data center simultaneously, thereby improving the efficiency in obtaining the request result for the user and reporting the data.

Figure 2:
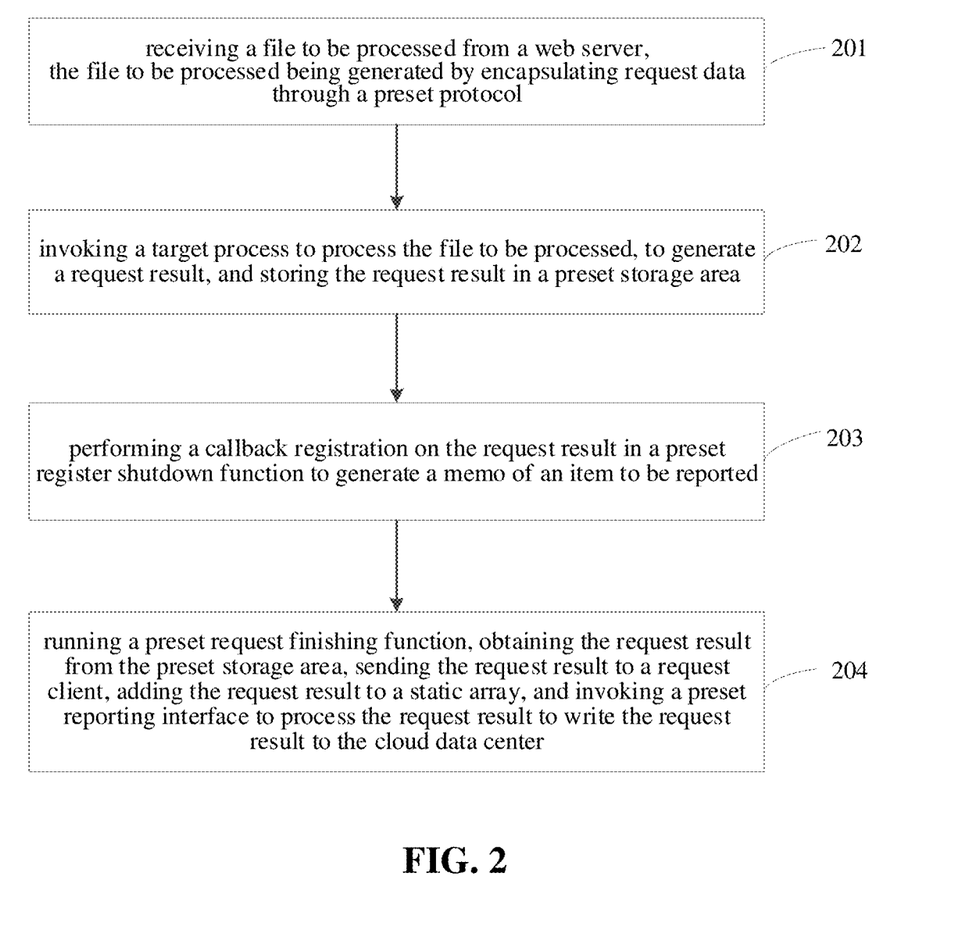
FIG. 2 is a flowchart of a data processing method according to an embodiment of the disclosure.

FIG. 2 is a flowchart of a data processing method according to an embodiment of the disclosure. As illustrated in FIG. 2, the method includes the following.

At block 201, a file to be processed is received from a web server, in which the file to be processed is generated by encapsulating request data through a preset protocol.

At block 202, a target process is invoked to process the file to be processed, to generate a request result, and the request result is stored in a preset storage area.

The foregoing explanations of blocks 101-102 are also applicable to blocks 201-202 of this embodiment, which will not be repeated here.

At block 203, a callback registration is performed on the request result in a preset register shutdown function to generate a memo of an item to be reported.

At block 204, a preset request finishing function is run, the request result is obtained from the preset storage area, the request result is sent to a request client, the request result is added to a static array, and a preset reporting interface is invoked to process the request result to write the request result to the cloud data center.

In detail, the callback registration may be performed on the request result in a preset register shutdown function such as register_shutdown_function to generate the memo of the item to be reported. In other words, data processed for this request has not yet been reported, and thus the memo of the item to be reported may be generated to avoid leaving out the data or forgetting to report the data to the cloud data center.

Further, the preset request finishing function is run. The request result is obtained from the preset storage area and sent to the request client, and the request result is added to the static array. The preset reporting interface is invoked to process the request result to write the request result to the cloud data center. In other words, after invoking the preset request finishing function, data may be reported after the request result is fed back to the web server and sent to the request client. For users, the efficiency of obtaining the request result is improved, and it also feels like that the efficiency of data reporting is improved.

In order to describe the data processing method of embodiments of the disclosure comprehensively, the following description will be made on the processor of the web server side with reference to FIG. 3.

Figure 3:
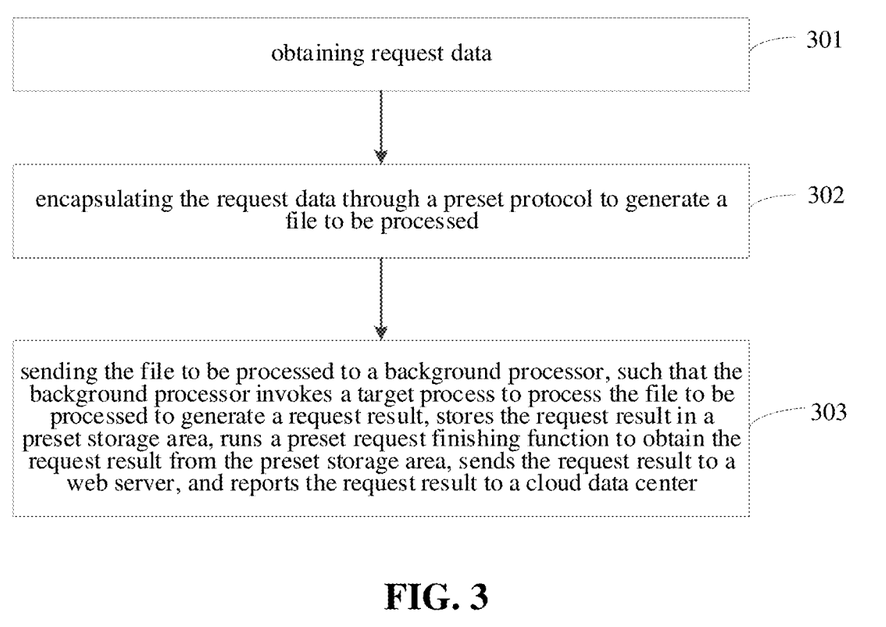
FIG. 3 is a flowchart of a data processing method according to an embodiment of the disclosure.

FIG. 3 is a flowchart of a data processing method according to an embodiment of the disclosure. As illustrated in FIG. 3, the method includes the following.

At block 301, request data is obtained.

At block 302, the request data is encapsulated through a preset protocol to generate a file to be processed.

In detail, after receiving the request data, the web server encapsulates the request data into the file to be processed through the preset protocol such as the FastCGI protocol, and then the file to be processed will be sent to the background processor, and a relevant process will be invoked to process the file to be processed.

At block 303, the file to be processed is sent to a background processor, such that the background processor invokes a target process to process the file to be processed to generate a request result, stores the request result in a preset storage area, runs a preset request finishing function to obtain the request result from the preset storage area, sends the request result to a web server, and reports the request result to a cloud data center.

In detail, the file to be processed is sent to the background processor, such that the background processor invokes the target process to process the file to be processed to generate the request result, and stores the request result in the preset storage area.

Different request data may correspond to different request results. For example, information of user A is obtained as the request data, by invoking the target process, a user identifier corresponding to user A is obtained and user information corresponding to the user identifier is queried from a corresponding database as the request result. The preset storage area may also be selected and set based on actual application needs.

Further, after the request result is generated by the background processor, the preset request finishing function such as fastcgi_finish_request( ) may be automatically or manually run by the user, which will directly end the data request of the FastCGI protocol, and the request result is returned to the web server. The web server sends the request result to the request client. Meanwhile, the request result is reported to the cloud data center.

It should be noted that, after obtaining the request data, the method further includes: determining whether the request data is a file in a preset format. Encapsulating the request data through the preset protocol to generate the file to be processed includes, in response to the request data being the file in the preset format, encapsulating the request data through an interactive program and a communication protocol of the web server to generate the file to be processed.

With the data processing method according to embodiments of the disclosure, the request data is obtained. The request data is encapsulated through the preset protocol to generate the file to be processed. The file to be processed is sent to the background processor, such that the background processor invokes the target process to process the file to be processed to generate the request result, stores the request result in the preset storage area, runs the preset request finishing function to obtain the request result from the preset storage area, sends the request result to the web server, and reports the request result to the cloud data center. Consequently, the data processing method solves the technical problem of low efficiency in providing the request result in the related art because the request result may be fed back to the user after data is reported. In addition, the request result may be sent to the web server and reported to the could data center simultaneously, thereby improving the efficiency in obtaining the request result for the user and reporting the data.

In order to make the above process clearer to those skilled in the art, example descriptions will be made below with specific scenarios in combination with FIG. 4.

Figure 4:
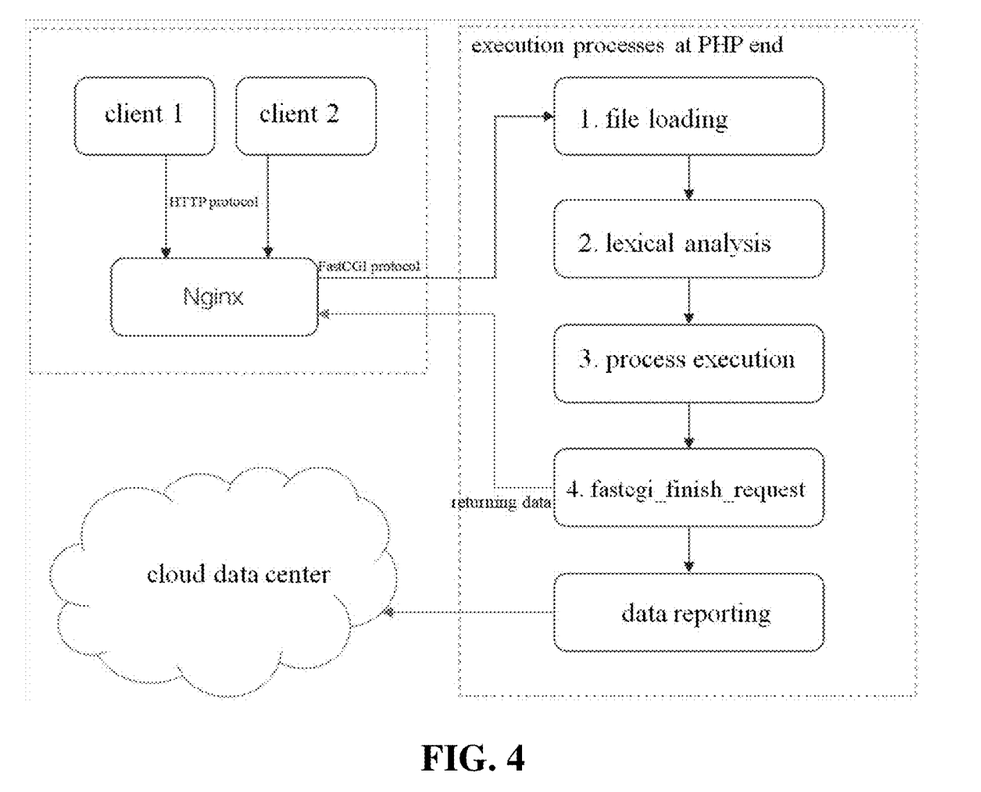
FIG. 4 is a schematic diagram of a data processing method according to an embodiment of the disclosure.

In detail, as illustrated in FIG. 4, a request from the client first reaches Webserver (Nginx). If the request data is the dynamic PHP file, Nginx encapsulates the request data through the FastCGI protocol and send the encapsulated request data to the back-end PHP-FPM (FastCGI Process Manager). Next, the PHP-FPM may assign a PHP process to perform processing such as file loading, lexical analysis, and process execution in FIG. 4 on the request, and then return the request result to Nginx. Finally, the request result is sent to the client as a response. The fastcgi_finish_request( ) may flush all the response data to the client and end the FastCGI request.

It may be understood that after invoking the fastcgi_finish_request( ) PHP may directly end the request from the FastCGI protocol and return data in a buffer to Nginx. However, as the PHP script has not ended currently, some tasks that have nothing to do with processes of main services or are time-consuming may be run after the PHP script is ended, so that more functions may be completed without increasing processes of main services. As illustrated in FIG. 4, after running the fastcgi_finish_request( ) the request result may be returned to Nginx while data may be reported. Feedback data and reported data may be the same or different. Generally, the reported data includes, but is not limited to, the feedback data.

It should be noted that there are many ways to report data. As a possible implementation, the callback registration is performed in the register_shutdown_function. What will be executed before the end of the PHP program, that is, the callback registration may label items to be reported to avoid omissions of items. It is determined whether there is the fastcgi_finish_request in the current environment. If there is, the function will be invoked, the FastCGI request will be automatically ended, and the data in the buffer will be returned to Nginx. The reported data is collected and used as parameters. It is supported to invoke and collect the reported data repeatedly. The reported data will be appended to the static array log, and the reporting interface is invoked to request the array log as a parameter. The reporting interface is written to a log file for future problem tracking.

Therefore, without adding additional message queue components and developing schedulers, asynchronous data reporting may be achieved in the fastest manner and with the lowest cost. In addition, the reporting logic will neither affect performance of the processes of main services (requesting the client to obtain the request result), nor increase the time taken by the processes of main services.

To implement the above embodiments, the disclosure further provides a data processing apparatus.

Figure 5:
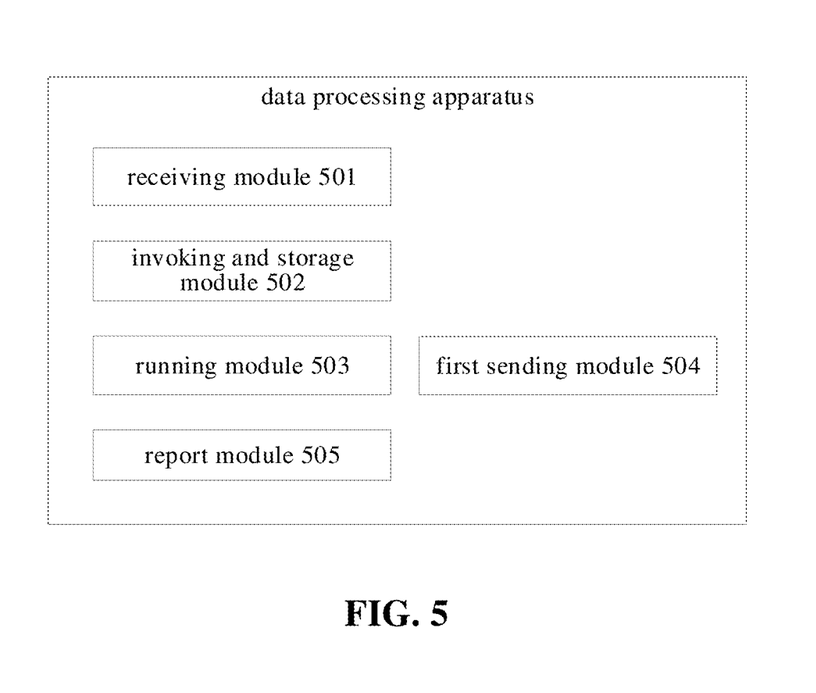
FIG. 5 is a block diagram of a data processing apparatus according to an embodiment of the disclosure.

FIG. 5 is a block diagram of a data processing apparatus according to an embodiment of the disclosure. As illustrated in FIG. 5, the apparatus includes a receiving module 501, an invoking and storage module 502, a running module 503, a first sending module 504, and a report module 505.

The receiving module 501 is configured to receive a file to be processed from a web server, the file to be processed being generated by encapsulating request data through a preset protocol.

The invoking and storage module 502 is configured to invoke a target process to process the file to be processed to generate a request result, and to store the request result in a preset storage area.

The running module 503 is configured to run a preset request finishing function.

The first sending module 504 is configured to obtain the request result from the preset storage area and to send the request result to the web server.

The report module 505 is configured to report the request result to a cloud data center.

Optionally, the report module 505 is configured to: add the request result to a static array, and invoke a preset reporting interface to process the request result to write the request result to the cloud data center.

Figure 6:
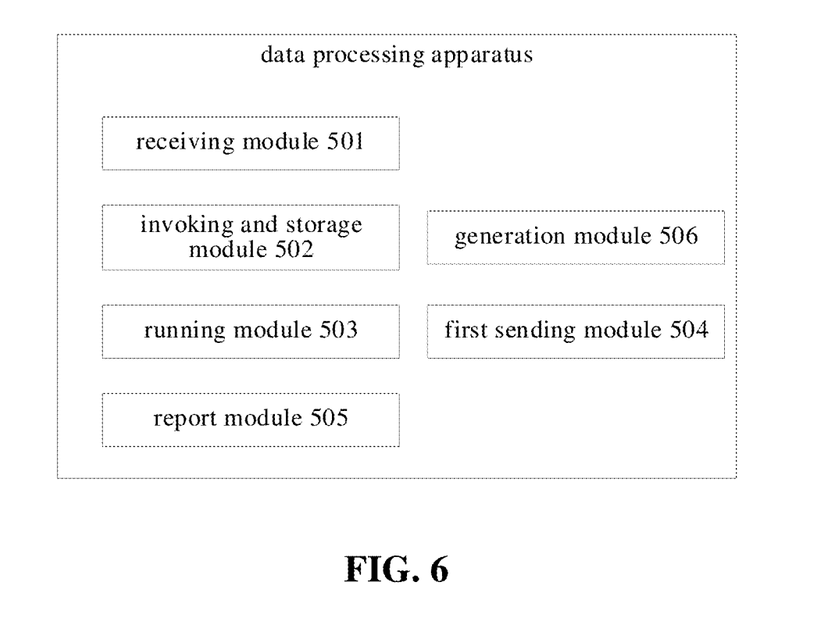
FIG. 6 is a block diagram of a data processing apparatus according to an embodiment of the disclosure.

On the basis of FIG. 5, as illustrated in FIG. 6, the apparatus further includes a generation module 506.

The generation module 506 is configured to perform a callback registration on the request result in a preset register shutdown function to generate a memo of an item to be reported.

It should be noted that the explanation of the data processing method in the foregoing embodiments is also applicable to the data processing apparatus in this embodiment, and details will not be described herein again.

With the data processing apparatus according to embodiments of the disclosure, the file to be processed from the web server, which is generated by encapsulating the request data through the preset protocol, is received; the target process is invoked to process the file to be processed to generate the request result, and the request result is stored in the preset storage area; the preset request finishing function is run, the request result is obtained from the preset storage area, the request result is sent to the web server, and the request result is reported to the cloud data center. Consequently, the disclosure solves the technical problem of low efficiency in providing the request result in the related art because the request result may be fed back to the user after data is reported. In addition, the request result may be sent to the web server and reported to the could data center simultaneously, thereby improving the efficiency in obtaining the request result for the user and reporting the data.

To implement the above embodiments, the disclosure further provides a data processing apparatus.

Figure 7:
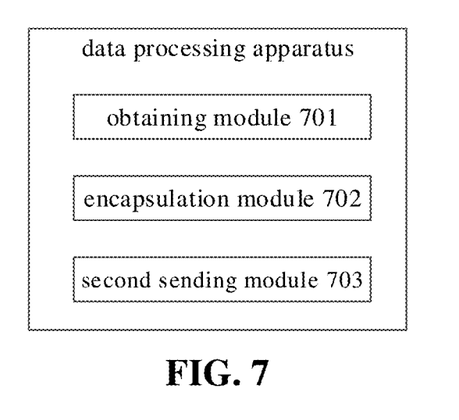
FIG. 7 is a block diagram of a data processing apparatus according to an embodiment of the disclosure.

FIG. 7 is a block diagram of a data processing apparatus according to an embodiment of the disclosure. As illustrated in FIG. 7, the apparatus includes an obtaining module 701, an encapsulation module 702, and a second sending module 703.

The obtaining module 701 is configured to obtain request data.

The encapsulation module 702 is configured to encapsulate the request data through a preset protocol to generate a file to be processed.

The second sending module 703 is configured to send the file to be processed to a background processor, such that the background processor invokes a target process to process the file to be processed to generate a request result, stores the request result in a preset storage area, runs a preset request finishing function to obtain the request result from the preset storage area, sends the request result to a web server, and reports the request result to a cloud data center.

Figure 8:
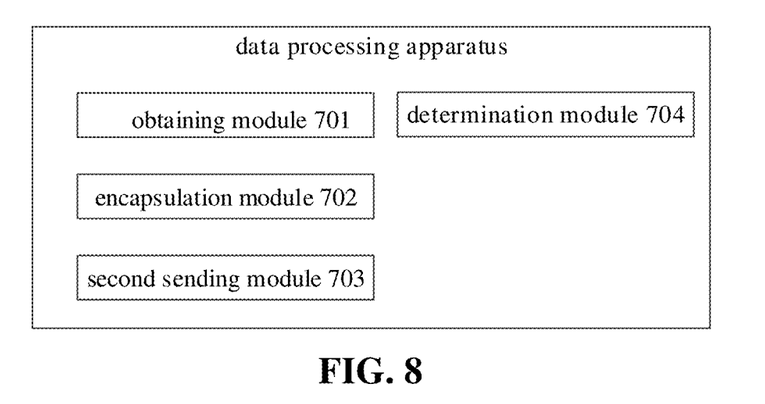
FIG. 8 is a block diagram of a data processing apparatus according to an embodiment of the disclosure.

On the basis of FIG. 7, as illustrated in FIG. 8, the apparatus further includes a determination module 704.

The determination module 704 is configured to determine whether the request data is a file in a preset format.

The encapsulation module 702 is configured to, in response to the request data being the file in the preset format, encapsulate the request data through an interactive program and a communication protocol of the web server to generate the file to be processed.

It should be noted that the explanation of the data processing method in the foregoing embodiments is also applicable to the data processing apparatus in this embodiment, and details will not be described herein again.

With the data processing apparatus according to embodiments of the disclosure, the request data is obtained. The request data is encapsulated through the preset protocol to generate the file to be processed. The file to be processed is sent to the background processor, such that the background processor invokes the target process to process the file to be processed to generate the request result, stores the request result in the preset storage area, runs the preset request finishing function to obtain the request result from the preset storage area, sends the request result to the web server, and reports the request result to the cloud data center. Consequently, the data processing method solves the technical problem of low efficiency in providing the request result in the related art because the request result may be fed back to the user after data is reported. In addition, the request result may be sent to the web server and reported to the could data center simultaneously, thereby improving the efficiency in obtaining the request result for the user and reporting the data.

To implement the above embodiments, the disclosure further provides a computer program product. When an instruction in the computer program product is executed by a processor, the data processing method of any one of the above embodiments is implemented.

According to embodiments of the disclosure, the disclosure further provides an electronic device and a readable storage medium.

Figure 9:
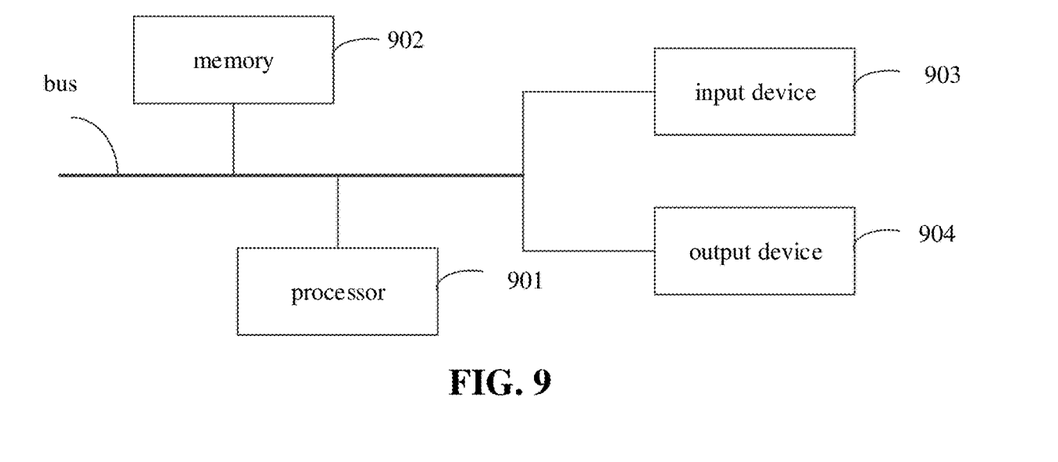
FIG. 9 is a block diagram of an exemplary electronic device suitable for implementing embodiments of the disclosure.

FIG. 9 is a block diagram of an exemplary electronic device suitable for implementing embodiments of the disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the disclosure described and/or required herein.

As shown in FIG. 9, the electronic device includes: one or more processors 901, a memory 902, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 901 is taken as an example in FIG. 9.

The memory 902 is a non-transitory computer-readable storage medium according to the embodiments of the disclosure. The memory stores instructions executable by at least one processor, so that the at least one processor executes the data processing method of the disclosure. The non-transitory computer-readable storage medium according to the disclosure stores computer instructions, which are configured to make the computer execute the data processing method of the disclosure.

As a non-transitory computer-readable storage medium, the memory 902 may be configured to store non-transitory software programs, non-transitory computer executable programs and modules, such as program instructions/modules (for example, the receiving module 501, the invoking and storage module 502, the running module 503, the first sending module 504, and the report module 505 illustrated in FIG. 5, or the obtaining module 701, the encapsulation module 702, and the second sending module 703 illustrated in FIG. 7) corresponding to the data processing method according to the embodiment of the disclosure. The processor 901 executes various functional applications and performs data processing of the server by running non-transitory software programs, instructions and modules stored in the memory 902, that is, the data processing method according to the foregoing method embodiments is implemented.

The memory 902 may include a storage program area and a storage data area, where the storage program area may store an operating system and applications required for at least one function; and the storage data area may store data created according to the use of the electronic device, and the like. In addition, the memory 902 may include a high-speed random-access memory, and may further include a non-transitory memory, such as at least one magnetic disk memory, a flash memory device, or other non-transitory solid-state memories. In some embodiments, the memory 902 may optionally include memories remotely disposed with respect to the processor 901, and these remote memories may be connected to the electronic device through a network. Examples of the network include, but are not limited to, the Internet, an intranet, a local area network, a mobile communication network, and combinations thereof.

The electronic device configured to implement the data processing method may further include an input device 903 and an output device 904. The processor 901, the memory 902, the input device 903 and the output device 904 may be connected through a bus or in other manners. FIG. 9 is illustrated by establishing the connection through a bus.

The input device 903 may receive input numeric or character information, and generate key signal inputs related to user settings and function control of the electronic device, such as a touch screen, a keypad, a mouse, a trackpad, a touchpad, a pointing stick, one or more mouse buttons, trackballs, joysticks and other input devices. The output device 904 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solutions according to embodiments of the disclosure, the request data is obtained. The request data is encapsulated through the preset protocol to generate the file to be processed. The file to be processed is sent to the background processor, such that the background processor invokes the target process to process the file to be processed to generate the request result, stores the request result in the preset storage area, runs the preset request finishing function to obtain the request result from the preset storage area, sends the request result to the web server, and reports the request result to the cloud data center. Consequently, the data processing method solves the technical problem of low efficiency in providing the request result in the related art because the request result may be fed back to the user after data is reported. In addition, the request result may be sent to the web server and reported to the could data center simultaneously, thereby improving the efficiency in obtaining the request result for the user and reporting the data.

It should be understood that various forms of processes shown above may be reordered, added or deleted. For example, the blocks described in the disclosure may be executed in parallel, sequentially, or in different orders. As long as the desired results of the technical solution disclosed in the disclosure may be achieved, there is no limitation herein.

The foregoing specific implementations do not constitute a limit on the protection scope of the disclosure. It should be understood by those skilled in the art that various modifications, combinations, sub-combinations and substitutions may be made according to design requirements and other factors. Any modification, equivalent replacement and improvement made within the spirit and principle of the disclosure shall be included in the protection scope of the disclosure.

What is claimed is:

1. A data processing method, implemented by a background processor and comprising:
    receiving a file to be processed from a web server, wherein the file to be processed is generated by encapsulating request data through a preset protocol;
    invoking a target process to process the file to be processed, to generate a request result;
    storing the request result in a preset storage area;
    running a preset request finishing function, wherein the preset request finishing function is configured to end a data request of the preset protocol;
    obtaining the request result from the preset storage area in response to running the preset request finishing function;
    sending the request result to the web server;
    reporting the request result to a cloud data center; and
    performing a callback registration on the request result in a preset register shutdown function to generate a memo of an item to be reported, wherein the callback registration is configured to label the request result to avoid omissions of the request result.

2. The method of claim 1, wherein the preset protocol has a correspondence with the target process.

3. The method of claim 1, wherein reporting the request result to the cloud data center comprises:
    adding the request result to a static array, and invoking a preset reporting interface to process the request result to write the request result to the cloud data center, wherein the static array is an array log, the preset reporting interface is invoked to request the array log as a parameter to process the request result to write the request result to the cloud data center and is written to a log file for future problem tracking.

4. The method of claim 1, further comprising:
reporting request receiving time, request processing time, database used and a user identifier to the cloud data center.

5. An electronic device, comprising:
at least one processor; and
a storage device communicatively connected to the at least one processor; wherein,
the storage device stores an instruction executable by the at least one processor, and the instruction is executed by the at least one processor to enable the at least one processor to perform a data processing method, the method comprising:
    receiving a file to be processed from a web server, wherein the file to be processed is generated by encapsulating request data through a preset protocol;
    invoking a target process to process the file to be processed, to generate a request result;
    storing the request result in a preset storage area;
    running a preset request finishing function, wherein the preset request finishing function is configured to end a data request of the preset protocol;
    obtaining the request result from the preset storage area in response to running the preset request finishing function;
    sending the request result to the web server;
    reporting the request result to a cloud data center; and
    performing a callback registration on the request result in a preset register shutdown function to generate a memo of an item to be reported, wherein the callback registration is configured to label the request result to avoid omissions of the request result.

6. The electronic device of claim 5, wherein the preset protocol has a correspondence with the target process.

7. The electronic device of claim 5, wherein reporting the request result to the cloud data center comprises:
    adding the request result to a static array, and invoking a preset reporting interface to process the request result to write the request result to the cloud data center, wherein the static array is an array log, the preset reporting interface is invoked to request the array log as a parameter to process the request result to write the request result to the cloud data center and is written to a log file for future problem tracking.

8. The electronic device of claim 5, wherein the method further comprises:
    reporting request receiving time, request processing time, database used and a user identifier to the cloud data center.

* * * * *